(12) United States Patent
Bradshaw et al.

(10) Patent No.: US 9,714,080 B2
(45) Date of Patent: Jul. 25, 2017

(54) WING TIP DEVICE HAVING CONFIGURATIONS FOR FLIGHT AND GROUND-BASED OPERATIONS

(71) Applicant: Airbus Operations Limited, Bristol (GB)

(72) Inventors: Philip John Templeton Bradshaw, Bristol (GB); Ian Roy Whitehouse, Bristol (GB); Norman Wood, Bristol (GB); Stuart Alexander, Bristol (GB); John David Randall, Bristol (GB)

(73) Assignee: Airbus Operations Limited, Bristol (GB)

( * ) Notice: Subject to any disclaimer, the term of this patent is extended or adjusted under 35 U.S.C. 154(b) by 59 days.

(21) Appl. No.: 14/765,228

(22) PCT Filed: Jan. 22, 2014

(86) PCT No.: PCT/GB2014/050166
§ 371 (c)(1),
(2) Date: Jul. 31, 2015

(87) PCT Pub. No.: WO2014/118508
PCT Pub. Date: Aug. 7, 2014

(65) Prior Publication Data
US 2015/0360765 A1  Dec. 17, 2015

(30) Foreign Application Priority Data

Jan. 31, 2013 (GB) .................................. 1301680.3

(51) Int. Cl.
*B64C 23/06* (2006.01)
*B64C 3/56* (2006.01)
*B64C 5/08* (2006.01)

(52) U.S. Cl.
CPC ................. *B64C 3/56* (2013.01); *B64C 5/08* (2013.01); *B64C 23/065* (2013.01); *Y02T 50/164* (2013.01)

(58) Field of Classification Search
CPC .... B64C 3/56; B64C 5/06; B64C 5/08; B64C 9/00; B64C 23/06; B64C 23/065
See application file for complete search history.

(56) References Cited

U.S. PATENT DOCUMENTS 1,888,418 A * 11/1932 Adams .................... B64C 23/06
244/107
2,418,301 A * 4/1947 Heal ........................ B64C 3/42
244/102 R (Continued)

FOREIGN PATENT DOCUMENTS

DE  10 2010 017 509  5/2011

OTHER PUBLICATIONS

European Search Report mailed Apr. 10, 2014, three pages.

*Primary Examiner* — Tien Dinh
*Assistant Examiner* — Michael A Fabula
(74) *Attorney, Agent, or Firm* — Nixon & Vanderhye P.C.

(57) ABSTRACT

An aircraft including a wing, the end of the wing having a wing tip device, wherein the wing tip device includes a moveable region that is rotatable, about an axis of rotation extending out of the plane of the wing tip device, between: (i) a high-altitude cruise configuration in which the moveable region extends downwardly below the wing; and (ii) a ground-operating configuration in which the moveable region extends rearwardly behind the wing such that the ground clearance of the wing tip device is increased.

11 Claims, 13 Drawing Sheets

(56) References Cited

U.S. PATENT DOCUMENTS

| | | | | |
|---|---|---|---|---|
| 2,562,905 | A * | 8/1951 | Gadeberg | B64C 3/42 244/102 A |
| 2,961,196 | A * | 11/1960 | Atkinson | B64C 3/40 244/46 |
| 3,411,738 | A * | 11/1968 | Sargent | B64C 3/00 244/199.2 |
| 4,247,062 | A * | 1/1981 | Brueckner | B64C 5/08 244/36 |
| 4,247,063 | A * | 1/1981 | Jenkins | B64C 5/08 244/199.4 |
| 4,457,479 | A * | 7/1984 | Daude | B64C 5/08 244/199.4 |
| 4,538,779 | A * | 9/1985 | Goldstein | B64C 5/10 244/225 |
| 4,598,885 | A * | 7/1986 | Waitzman | B64C 3/185 244/13 |
| 4,722,499 | A * | 2/1988 | Klug | B64C 23/065 244/199.4 |
| 5,072,894 | A * | 12/1991 | Cichy | B64C 3/42 244/49 |
| 5,094,411 | A * | 3/1992 | Rao | B64C 19/00 244/214 |
| 5,156,358 | A * | 10/1992 | Gerhardt | B64C 5/08 244/199.4 |
| 5,356,094 | A * | 10/1994 | Sylvain | B64C 3/56 244/123.9 |
| 5,988,563 | A * | 11/1999 | Allen | B64C 3/42 244/45 R |
| 6,345,790 | B1 * | 2/2002 | Brix | B64C 23/065 244/199.4 |
| 6,547,181 | B1 * | 4/2003 | Hoisington | B60V 1/08 114/272 |
| 7,503,527 | B1 * | 3/2009 | Fairchild | B64C 3/54 244/198 |
| 7,597,285 | B2 * | 10/2009 | Schweiger | B64C 3/38 244/75.1 |
| 7,744,038 | B2 * | 6/2010 | Sankrithi | B64C 23/065 244/199.1 |
| 7,988,100 | B2 * | 8/2011 | Mann | B64C 23/065 244/199.2 |
| 8,651,431 | B1 * | 2/2014 | White | B64C 23/065 244/199.4 |
| 8,757,555 | B2 * | 6/2014 | Werthmann | B64C 23/065 244/199.4 |
| 9,079,661 | B2 * | 7/2015 | Prampolini | B64C 3/10 |
| 9,290,260 | B2 * | 3/2016 | Lassen | B64C 3/56 |
| 9,296,469 | B2 * | 3/2016 | Santini | B64C 3/56 |
| 9,469,391 | B1 * | 10/2016 | Dong | B64C 3/385 |
| 2004/0065246 | A1 * | 4/2004 | Allen | B60V 1/22 114/274 |
| 2006/0027703 | A1 * | 2/2006 | Bussom | B64C 23/065 244/17.13 |
| 2008/0191099 | A1 | 8/2008 | Werthmann et al. | |
| 2009/0039204 | A1 * | 2/2009 | Eberhardt | B64C 23/065 244/199.4 |
| 2009/0200431 | A1 * | 8/2009 | Konings | B64C 3/385 244/213 |
| 2011/0142642 | A1 * | 6/2011 | McGrath | F03D 1/065 416/135 |
| 2011/0206528 | A1 * | 8/2011 | Kang | B60V 1/08 416/223 R |
| 2013/0099060 | A1 * | 4/2013 | Dees | B64C 3/56 244/199.4 |
| 2013/0341467 | A1 * | 12/2013 | Sakurai | B64C 3/56 244/201 |

* cited by examiner ated to extend in a direction substantially parallel to the longitudinal axis of the air vehicle. The direction of extension of the wing tip device will be readily apparent, but in the event of any uncertainty, the direction of extension may be measured by the direction of a notional line passing through the tip, and along the mid-chord, of the downwardly extending wing tip device.

WING TIP DEVICE HAVING CONFIGURATIONS FOR FLIGHT AND GROUND-BASED OPERATIONS

RELATED APPLICATIONS

This application is the U.S. national phase of International Application No. PCT/GB2014/050166 filed 22 Jan. 2014 which designated the U.S. and claims priority to GB 1301680.3 filed 31 Jan. 2013, the entire contents of each of which applications are hereby incorporated by reference.

TECHNICAL FIELD

The present invention relates to an aircraft having a downwardly extending wing tip device, and to a method of configuring the wing tip device.

BACKGROUND OF THE INVENTION

The use of wing tip devices, such as winglets, on aircraft is well known. Such devices seek to improve the aerodynamic performance of the aircraft, typically reducing induced drag and increasing lift. It can be desirable to have relatively long wing tip devices, but the length of downwardly extending (anhedral) wing tip devices tends to be limited by airport operating rules which govern various clearances required when maneuvering around the airport (such as the span and/or ground clearance required for gate entry and safe taxiway usage). There has therefore tended to be a focus on using longer upwardly extending (dihedral) wing tip devices, than downwardly extending devices.

SUMMARY OF THE INVENTION

According to a first aspect of the invention, there is provided an air vehicle comprising a wing, the end of the wing having a wing tip device, the wing tip device being configurable between:

(i) a high-altitude cruise configuration in which the wing tip device extends downwardly below the wing; and (ii) a ground-operating configuration in which the wing tip device extends rearwardly such that the ground clearance of the wing tip device is increased and the effective span of the wing is decreased. The present invention therefore allows a relatively long downwardly extending wing tip device to be used during flight, but for the ground clearance to then be increased during operations on the ground to adhere to airport clearance rules.

In the high-altitude cruise configuration, the wing tip device extends downwardly below the wing. Such a downwardly extending wing tip device may also be referred to as being an anhedral/negative dihedral wing tip device, or a downwardly canted wing tip device.

In the ground-operating configuration, the wing tip device extends rearwardly, preferably behind the wing, such that the ground clearance of the wing tip device is increased. In the ground-operating configuration the wing tip device may still be downwardly extending to some degree, but it will be appreciated that the downward extension is less than the downward extension in the high-altitude cruise configuration. In the ground-operating configuration, the wing tip device may be arranged to extend in a substantially freestream direction. In the ground-operating configuration, the wing tip device may be arranged to extend in a direction substantially parallel to the ground plane. In the ground-operating configuration, the wing tip device may be In some embodiments of the invention, the wing tip device may be configurable to yet another configuration after adopting the ground-operating configuration. In the yet another configuration the wing tip device may be arranged to extend in a direction towards the wing root. In the yet another configuration the wing tip device may be arranged to extend substantially parallel to the wing trailing edge. This may be useful for ensuring there is sufficient clearance for service vehicle access and alike.

In embodiments of the invention, in the ground-operating configuration, the wing tip device extends rearwardly, preferably behind the wing, such that the effective span of the wing is not increased (relative to the high-altitude cruise configuration). The effective span of the wing is preferably at least maintained and more preferably decreased. For example, the wing tip device and/or the axis of rotation about which the wing tip device rotates may be canted, or otherwise orientated, such that during rotation of the wing tip device, the wing tip device moves inwardly.

The whole wing tip device need not necessarily move when changing between the high-altitude cruise configuration and the ground-operating configuration. The wing tip device may comprise a moveable region that is rotatable about an axis of rotation. The axis of rotation may extend out of the plane of the wing tip device. The moveable region may be rotatable about the axis such that in the high-altitude cruise configuration the moveable region extends downwardly below the wing, and in the ground-operating configuration the moveable region rearwardly extends behind the wing. The axis may be substantially perpendicular to the plane of the wing tip device. The wing tip device may be arranged to rotate within its own plane.

It will be appreciated that reference herein to a "region" of the wing tip device typically refers to a 3D body defining part, or in some embodiments all, of the wing tip device. The region typically comprises an aerodynamic surface of the wing tip device.

The plane of the wing tip device will be readily apparent to the person skilled in the art. In event of any doubt, the plane is preferably defined by a plane incorporating at least two points along the interface between the wing tip device and the wing, and also incorporating the tip of the wing tip device.

The moveable region may be detachable from the wing. Such an arrangement enables the moveable region to be removed if it is damaged, such that the air vehicle can still be operated in the event there has been damage to this part.

According to a second aspect of the invention, there is provided an air vehicle comprising a wing, the end of the wing having a wing tip device, wherein the wing tip device comprises a moveable region that is rotatable, about an axis of rotation extending out of the plane of the wing tip device, between:

(i) a high-altitude cruise configuration in which the moveable region extends downwardly below the wing; and (ii) a ground-operating configuration in which the moveable region extends rearwardly such that the ground clearance of the wing tip device is increased. The present invention therefore allows a relatively long downwardly extending wing tip device to be used during flight without violating airport ground clearance rules (when the wing tip device is configured in the ground-operating configuration).

In either aspect of the invention, the moveable region may form the whole of the wing tip device. More preferably, the moveable region is only part thereof. For example, the wing tip device may comprise a fixed region, downwardly extending from the wing and fixed relative thereto. The moveable region may be rotatably mounted on the fixed region. By providing a fixed downwardly extending region, some aerodynamic benefits of the wing tip device may be maintained even when the wing tip device is in the ground-operating configuration. This may be useful if the wing tip device is to be temporarily configured in the ground-operating configuration during flight (for example shortly before landing). The fixed region may have an aerofoil cross-section. The fixed region may act as a fixed winglet.

In principle, the wing tip device may be configurable to intermediate configurations between the high-altitude cruise configuration and the ground-operating configuration. For example, for take-off, the wing tip device may be configurable to an intermediate configuration that generates relatively low drag. For landing, the wing tip device may be configurable to an intermediate configuration that generates relatively high drag. In some embodiments of the invention, the wing tip device is configurable only between the high-altitude cruise configuration and the ground-operating configuration.

The wing tip device is preferably arranged such that the fixed region does not interfere with the moveable region during movement of the moveable region between the high-altitude cruise configuration and the ground-operating configuration. Such an arrangement may be achieved by, for example, providing a cut-away in one or both regions. More preferably however, the fixed region and the moveable region form (in the high-altitude configuration) a substantially smooth aerodynamic surface extending from the fixed region to the moveable region. In the high-altitude configuration, the trailing edge of the moveable region may be a continuation of the trailing edge of the fixed region. In the high-altitude configuration, the leading edge of the moveable region may be a continuation of the leading edge of the fixed region. In such embodiments, the moveable and fixed regions are preferably divided by a cut-plane. The cut-plane is preferably orientated perpendicular to the axis of rotation of the moveable region. Such an arrangement ensures the fixed and moveable structures do not interfere during rotation of the moveable region about said axis (and negates the need for a cut-away or other structural modification to avoid the interference). The cut-plane preferably passes through the leading edge, and the trailing edge, of the wing tip device. It will be appreciated that the cut-plane is substantially planar.

The structures of the fixed region and the moveable region may overlap to form a substantially continual aerodynamic surface extending from the fixed region to the moveable region. For example, the inboard end of the moveable region may be sleeved within the fixed region.

The structure defining the fixed region may be arranged to house an actuator for effecting movement of the wing tip device between the high-altitude cruise configuration and the ground-operating configuration.

In the high-altitude cruise configuration the sweep of the wing tip device may be substantially equal to the sweep of the wing. In embodiments in which the wing tip device comprises a fixed region, the sweep of the fixed region may be substantially equal to the sweep of the wing. In other embodiments of the invention, the wing tip device (in the high-altitude cruise configuration) may have a greater sweep than the wing. Such an arrangement may be used to manage compressibility effects. In the ground-operating configuration, the sweep of the wing tip device, or at least the moveable region thereof, is preferably greater than the sweep of the wing.

The end of the wing may comprise a bulbous body protruding beyond the aerofoil cross-section of the wing, the wing tip device extending from the bulbous body. The bulbous portion is preferably located at the tip of the wing. The bulbous body may be arranged to house an actuator for effecting movement of the wing tip device between the high-altitude cruise configuration and the ground-operating configuration. The bulbous body is preferably of non-aerofoil cross section. The bulbous body may be a body of revolution. The bulbous body preferably forms a non-lifting surface.

The end of the wing may comprise a second wing tip device. The second wing tip device may extend upwardly above the wing. The first wing tip device (when in the high-altitude cruise configuration) is preferably arranged to counteract the vorticity from the second, upwardly extending, wing tip device. Thus, embodiments of the invention in which the wing has both the downwardly extending wing tip device, and an upwardly extending wing tip device, may have relatively low induced drag (without being unduly limited by the presence of the downwardly extending device by airport clearance rules).

Moveable downwardly extending wing tip devices have been suggested for ground-effect wings in U.S. Pat. No. 6,547,181 (Hoisington et al), in order to avoid damage to the main wing or instability due to a collision of the tip with the water above which the air vehicle flies. The wing tip device of the present invention is moveable between high-altitude cruise configuration and a ground-operating configuration; the present invention does not relate to ground-effect aircraft. The air vehicle is not a ground-effect aircraft. In embodiments of the present invention, the air vehicle may be suitable for high-altitude flight. For example, the air vehicle may be suitable for flight, between 15,000 ft and 45,000 ft, more preferably between 30,000 and 45,000 ft, and more preferably 35,000 to 42,000 ft. In embodiments of the invention, the air vehicle may be suitable for flight at speeds of between Mach 0.5 and 0.9, more preferably 0.75 and Mach 0.9, and more preferably at speeds of between Mach 0.8 and Mach 0.84. The air vehicle preferably comprises at least one, and more preferably a plurality, of jet powerplants. The air vehicle may, for example, be a UAV, but is more preferably an aircraft. The air vehicle is preferably a passenger aircraft.

The high-altitude cruise configuration refers to the configuration of the air vehicle when in high-altitude cruise. In the high-altitude cruise configuration, the air vehicle may be flying at between 30,000 and 45,000 ft, and more preferably 35,000 to 42,000 ft. In the high-altitude cruise configuration the air vehicle may be flying at between Mach 0.5 and 0.9, more preferably 0.75 and Mach 0.9, and more preferably between Mach 0.8 and Mach 0.84. It will be appreciated that cruise conditions are typically those that combine the highest altitude and speed that enable lowest sfc (specific fuel consumption), with the greatest ML/D (cruise Mach multiplied by lift-to-drag ratio), for the air vehicle weight at any point whilst airborne.

The ground-operating configuration refers to the configuration of the air vehicle when operating on the ground, or during low altitude flight during the landing/take-off (LTO) cycle in which the air vehicle is about to be/has just been on the ground.

The wing is preferably a dihedral wing. The present invention is especially attractive for dihedral wings because a downwardly extending wing tip device on a dihedral wing may offset, to at least some degree, any loss in effective span when the dihedral wing bends upwards during flight. In the high-altitude cruise configuration, the wing tip device may be higher than the lowest point of the air vehicle fuselage.

The wing may be positioned in a low-wing configuration. The wing may be positioned in a mid-wing configuration.

The air vehicle may comprise a control system for controlling operation of the wing tip device between the high-altitude cruise configuration and the ground-operating configuration. The control system may be arranged to configure the wing tip device in the high-altitude cruise configuration during flight, and the ground-operating configuration for ground-based operations (such as operations on the ground or during the LTO cycle).

According to another aspect of the invention there is provided a wing for use as the wing as described herein, the end of the wing having a wing tip device configurable between the high-altitude cruise configuration and the ground-operating configuration.

According to yet another aspect of the invention, there is provided a method of configuring a wing tip device on an air vehicle, the method comprising the steps of:

during flight, configuring the wing tip device in a high-altitude cruise configuration, in which high-altitude cruise configuration the wing tip device downwardly extends below the wing; and for ground-based operations, configuring the wing tip device in a ground-operating configuration, in which ground-operating configuration the wing tip device rearwardly extends behind the wing to increase the ground clearance of the wing tip device.

Ground-based operations refer to operations in which the air vehicle is on the ground, such as taxiing, or otherwise maneuvering around an airport. The method may comprise the step of configuring the wing tip device from the high-altitude cruise configuration to the ground-operating configuration, during the landing procedure (for example in conjunction with the landing gear being deployed). The method may comprise the step of configuring the wing tip device from the ground-operating configuration, to the high-lift cruise configuration after, or during, the take-off procedure (for example in conjunction with the landing gear being retracted).

Any features described with reference to one aspect of the invention are equally applicable to any other aspect of the invention, and vice versa. For example, and features described with reference to the air vehicle are equally applicable to the method of configuring the wing tip device.

DESCRIPTION OF THE DRAWINGS

Various embodiments of the invention will now be described, by way of example only, with reference to the accompanying schematic drawings of which.

DETAILED DESCRIPTION

Figure 1:
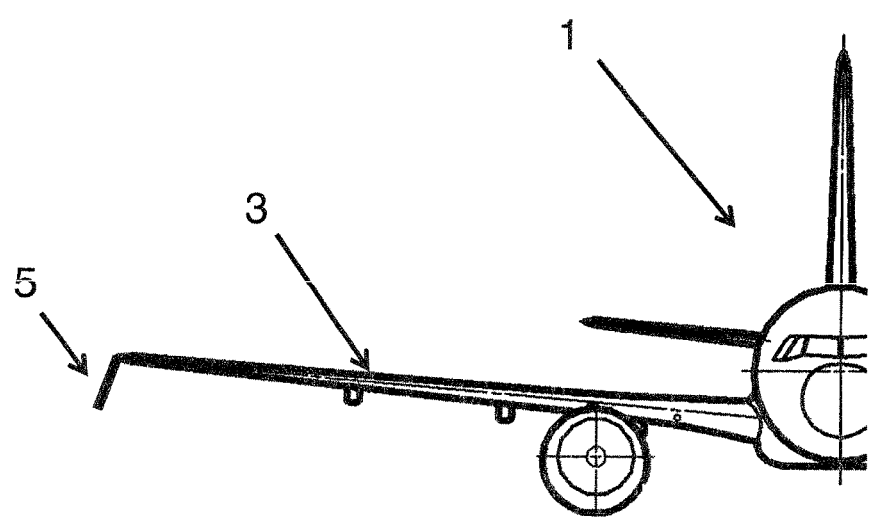
FIG. 1 is a front view of an aircraft according to a first embodiment of the invention.

FIG. 1 is a front view of one side of an aircraft 1 having a dihedral wing 3 and a downwardly extending wing tip device 5. The aircraft 1 is a passenger aircraft designed for cruise flight between 35,000 and 42,000 ft at around Mach 0.80-0.85. The planar wing tip device 5 is shown in a high-altitude cruise configuration in which the device 5 extends at a cant of around 160 degrees (i.e. 70 degrees below the horizontal).

The aerodynamic benefits of wing tip devices per se (typically in reducing induced drag) are well known. It can be desirable to have relatively long wing tip devices, but the length of downwardly extending wing tip devices tends to be limited by airport operating rules which govern various clearances required when maneuvering around the airport (such as the span and/or ground clearance required for gate entry).

Figure 2:
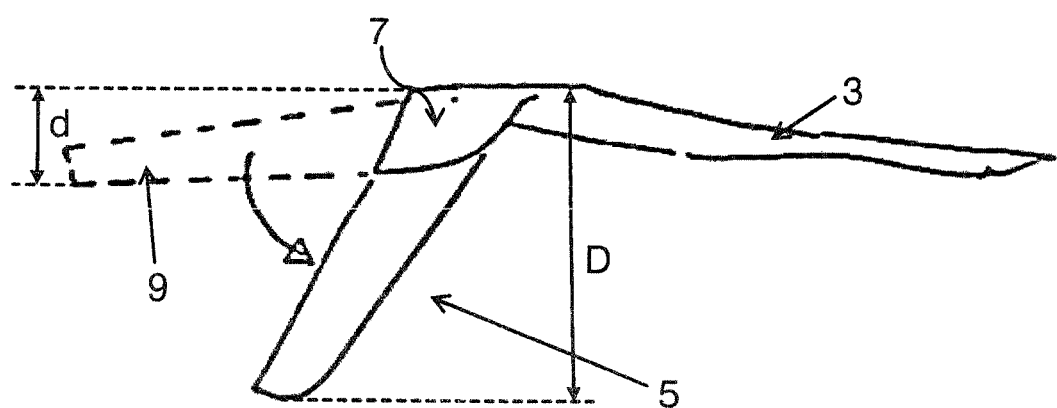
FIG. 2 is a slightly-off end-on view of the wing and wing tip device on the aircraft of FIG. 1.
Figure 3:
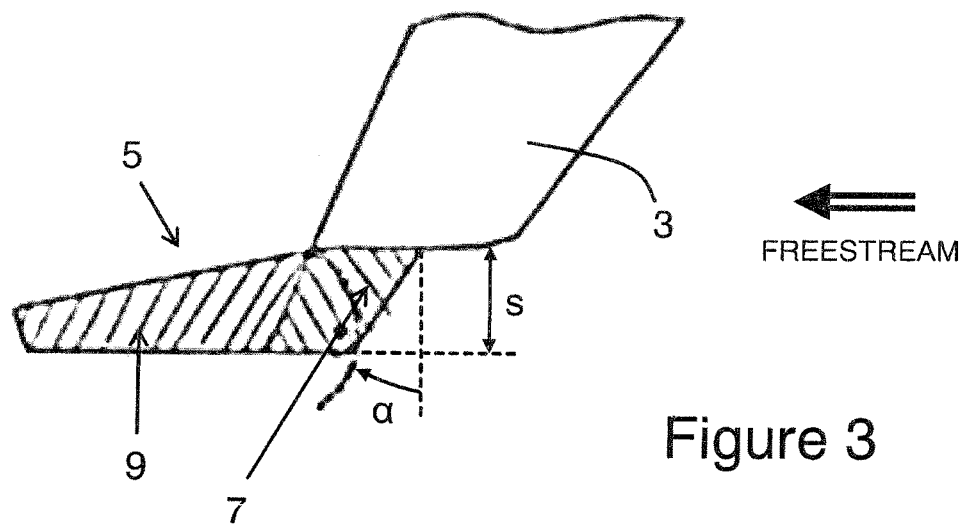
FIG. 3 is a plan view of the wing and wing tip device on the aircraft of FIG. 1.
Figure 4:
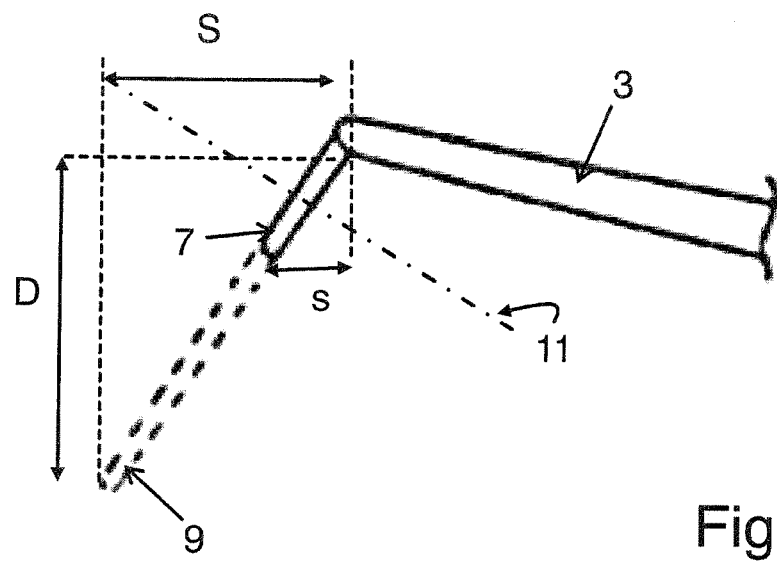
FIG. 4 is a front view of the wing and wing tip device on the aircraft of FIG. 1.

FIGS. 2, 3 and 4 show the wing tip device on the aircraft of the first embodiment of the invention from end, plan and front elevations respectively. For the sake of clarity, the effective span increase s, created by the wing tip device, is exaggerated in the plan view of FIG. 3.

The wing tip device 5 is formed of a fixed region 7 adjoining the aircraft wing 3, and a moveable region 9. A thin extension element (not shown) on the moveable region 9 overlaps the underside of the fixed region 7. The moveable region 9 is rotatably mounted on the fixed region 7 about an axis of rotation 11 (see FIG. 4) that passes through the overlap.

In FIG. 2, the structure defining the moveable region 9 is drawn as a continuous line to show the wing tip device 5 in a high-altitude cruise configuration, and is drawn as a dashed line to show the wing tip device 5 in a ground-operating configuration (described in more detail below). In FIG. 4, the rotatable region 9 is drawn as a dashed line to show the wing tip device 5 in the high-altitude cruise configuration, and is not visible in the ground-operating configuration (because it is obscured by the structure of the fixed region 7).

Referring to FIGS. 2 and 4, in the high-altitude cruise configuration, the moveable region 9 of the wing tip device 5 extends downwardly a distance D below the underside of the wing 3. Due to the cant of the wing tip device, it also increases the effective span of the wing 3 by a distance S. Such geometry is beneficial in reducing induced drag, but the downward and spanwise extensions D, S of the wing tip device are too great for airport clearance rules. To mitigate this, the wing tip device is configurable to the ground-operating configuration in which the moveable region 9 of the wing tip device 5 extends rearwardly behind the wing 3 substantially in line with the streamwise direction. The axis of rotation 11 of the moveable region 9 extends perpendicularly out of the plane of the wing tip device 5 such that the moveable region 9 rotates in its own plane. This reduces the downward extension of the wing tip device to a distance d and also reduces the contribution to the effective span to a reduced distance s, such that the aircraft (when the wing tip device 5 is in the ground-operating configuration) complies with airport clearance rules. The aircraft of the present invention can therefore benefit from the aerodynamic improvements of the wing tip device during flight, especially high-altitude cruise flight, whilst still being able to manoeuvre on the ground.

In the first embodiment of the invention, the wing tip device is substantially planar (no curve or camber) and of aerofoil cross-section. The fixed region 7 is set back a short distance from the leading edge of the wing 3 (see FIG. 3), but has the same sweep angle alpha. When the wing tip device 5 is arranged in the high-altitude cruise configuration, the moveable region 9 has the same sweep as the fixed region 7 and there is a smooth aerodynamic between the two; however when the tip device 5 is configured in the ground-operating configuration the sweep is increased (by rotating the moveable region 9 about the axis 11) such that the moveable region 9 is substantially streamwise.

The moveable region 9 is actuated by a motor (not shown) installed within the structure defining the fixed region 7. The motor drives a series of bevel gears to effect rotation. In other embodiments of the invention, different actuation mechanisms may be used, such as hydraulics or a morphing wing structure.

In the first embodiment of the invention, the aircraft comprises a control system (not shown) for control operation of the wing tip device between the two configurations. Prior to, and during, take-off, the wing tip device is in the ground-operating configuration. Shortly after take-off, the control system instructs the motor to rotate the moveable region 9 of the wing tip device 5 downwards and forward such that it matches the sweep of the fixed region 7 and is downwardly extending. The wing tip device maintains this high-altitude cruise configuration during climb, cruise and descent. As the aircraft approaches landing, the control system instructs the motor to reverse the rotation of the moveable region 9 such that the wing tip device reverts to the ground operating configuration.

Figure 5:
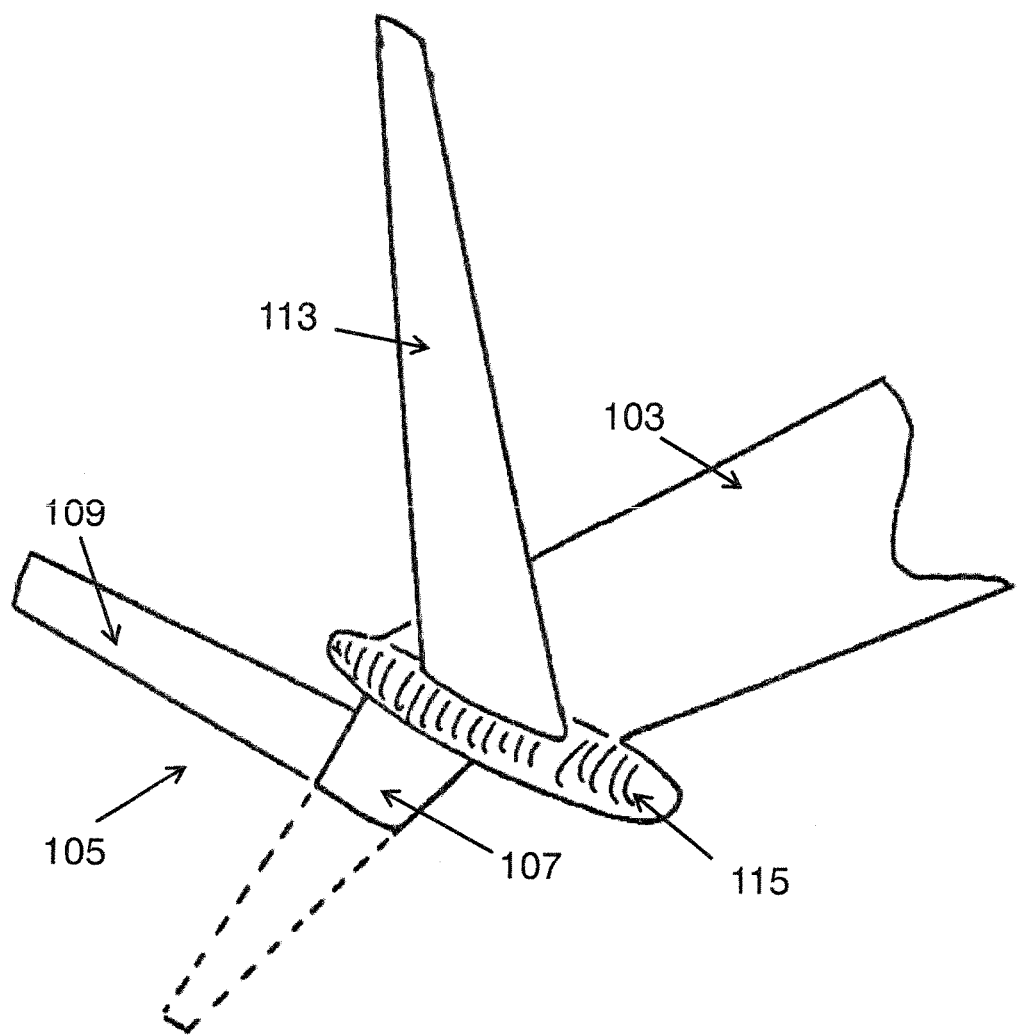
FIG. 5 is a perspective view of a wing and wing tip device on an aircraft according to a second embodiment of the invention.
Figure 6:
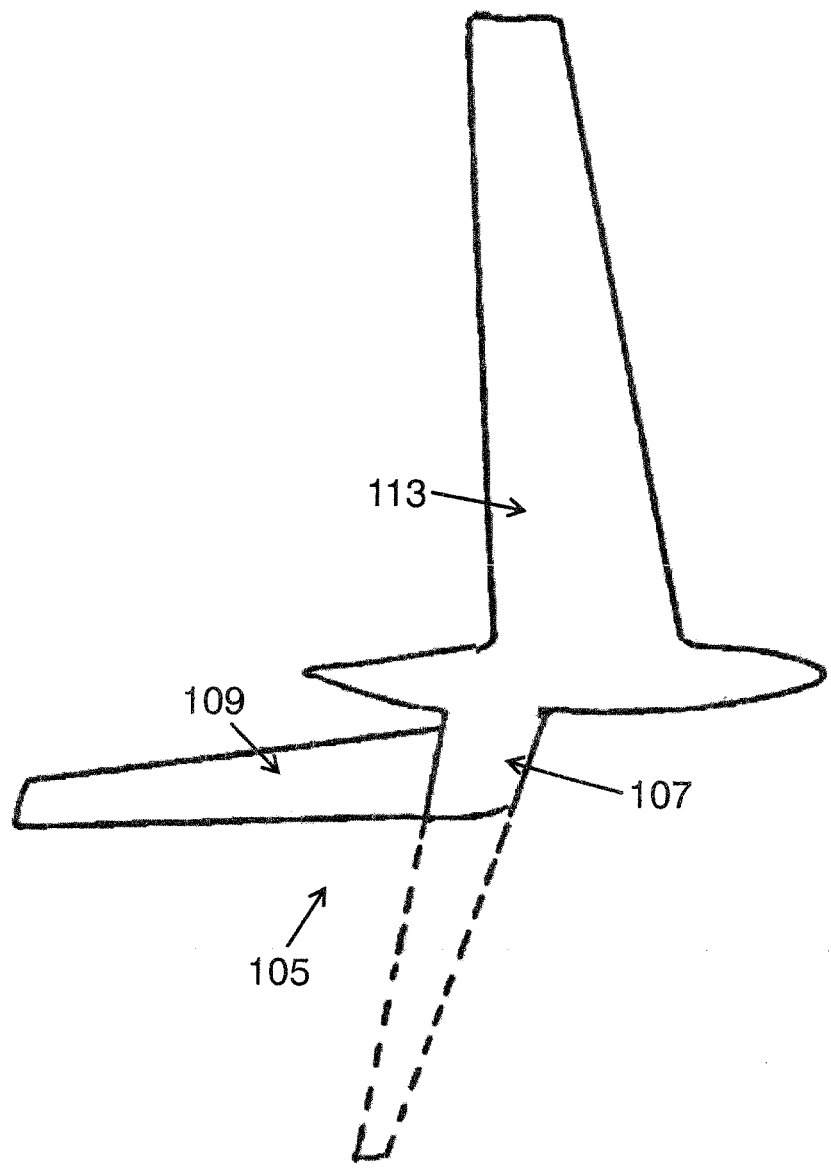
FIG. 6 is an end-on view of the wing and wing tip device of FIG. 5.
Figure 7:
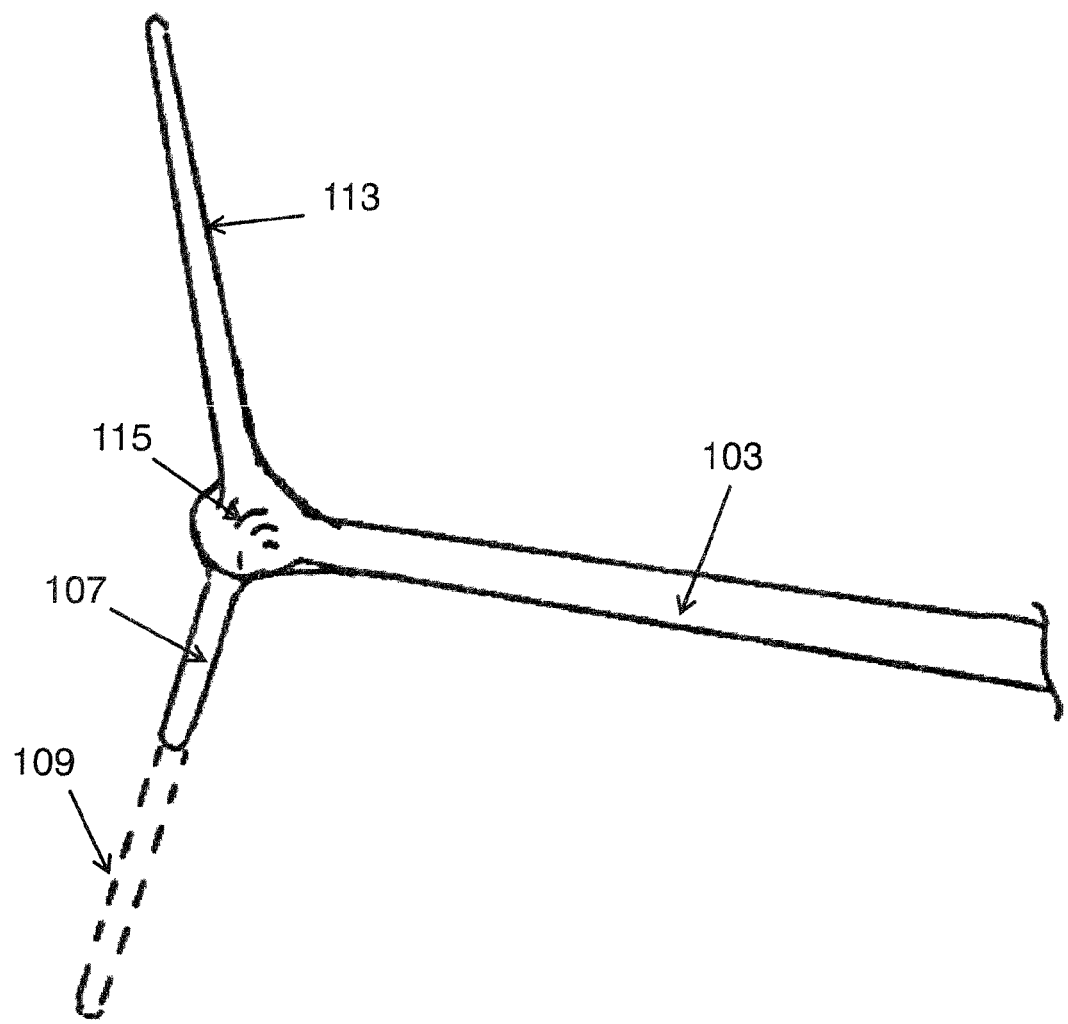
FIG. 7 is a front view of the wing and wing tip device of FIG. 5.

A second embodiment of the invention is shown in FIGS. 5 to 7. Features in the second embodiment of the invention that correspond to similar features in the first embodiment of the invention, are shown with the same reference numerals as in the first embodiment, but with the addition of the prefix '1' (or '10' where appropriate). The second embodiment is identical to the first embodiment except that the aircraft also comprises an upwardly extending wing tip device 113 at the end of the wing 103. The upwardly extending wing tip device 113 is fixed at a cant of 20 degrees (see FIG. 7) and is arranged to reduce downwash and improve sidewash. By using the upwardly extending device 113 in conjunction with the downwardly extending wing tip device 105, the net vorticity is reduced (in comparison to the upwardly extending device alone). The upwardly extending device is positioned forward of the downwardly extending device (see FIG. 6). In the second embodiment of the invention, the wing tip also comprises a bulbous body 115 from which the wing tip devices extend. The bulbous body 115 houses the actuator (not shown) for moving the downwardly extending wing tip device 105.

Figure 8:
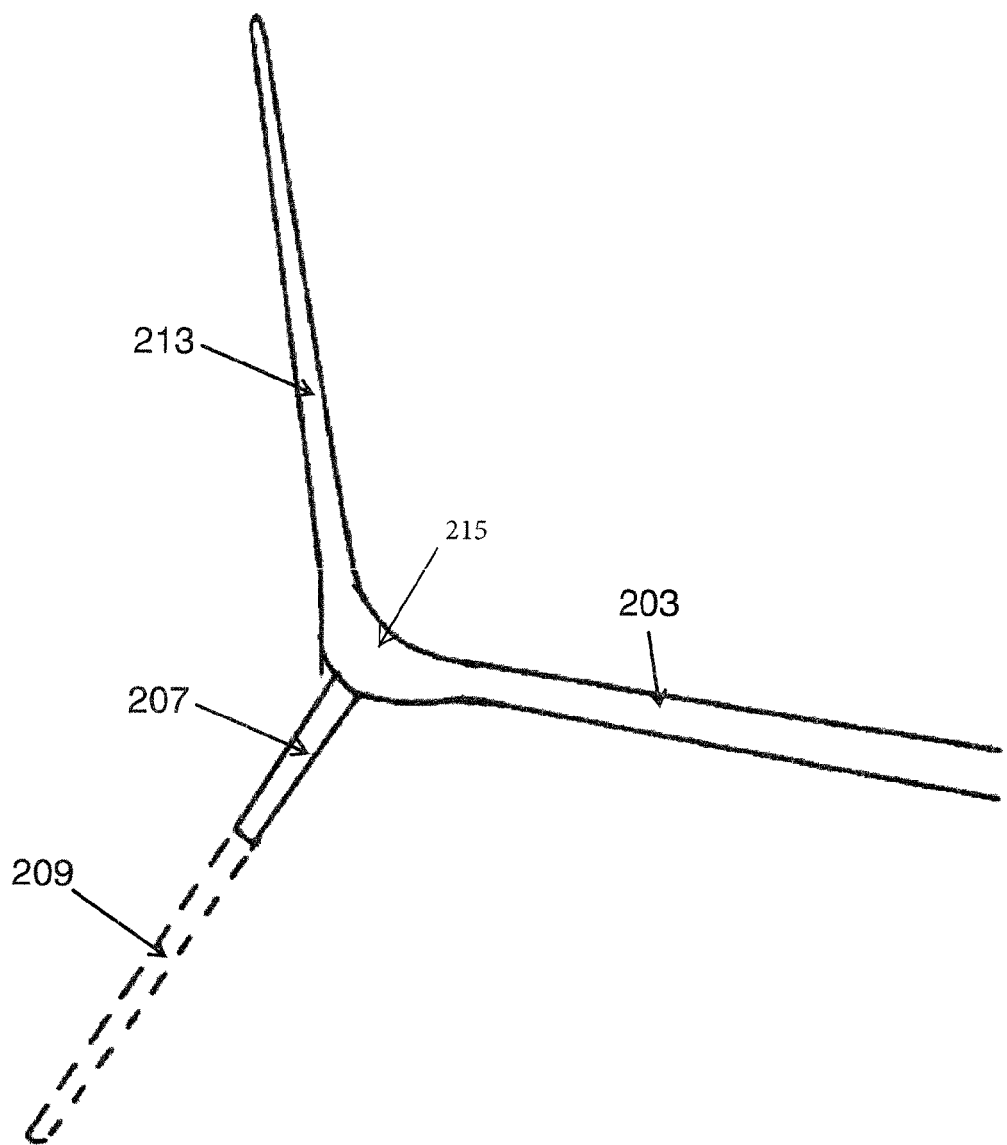
FIGS. 8 and 9 are front views of a wing and wing tip device according to further embodiments of the invention.
Figure 9:
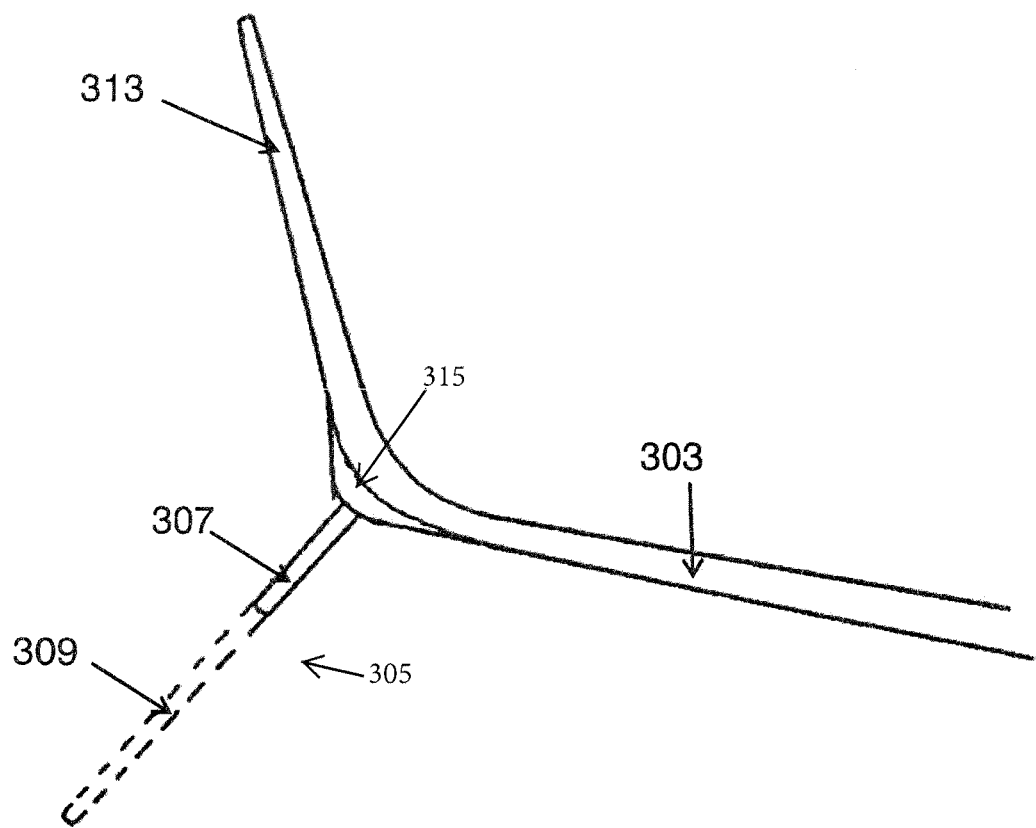

FIGS. 8 and 9 are front views of wing tip devices according to other embodiments of the invention. In the embodiment of FIG. 8, the reference numbers are 200 series numbers and each correspond to a respective one of the 100 series numbers shown in FIGS. 5 to 7. For example, the end of a wing is designated by reference number 203 in FIG. 8 and designated by 103 in FIG. 5. In FIG. 8, the upwardly extending wing tip device 213 is fixed at a lower cant than the second embodiment of the invention, and the bulbous body 215 protrudes further on the lower side of the wing 203 than the upper side. In the embodiment of FIG. 9, the reference numbers are 300 series numbers and each correspond to the 100 series numbers shown in FIGS. 5 to 7. For example, the end of a wing is designated by reference number 303 in FIG. 9 and designated by 103 in FIG. 5. The bulbous region 315 is located adjacent the root of the fixed region 307 of the downwardly extending device 305, but does not extend all the way to the leading edge of the wing.

Figure 10:
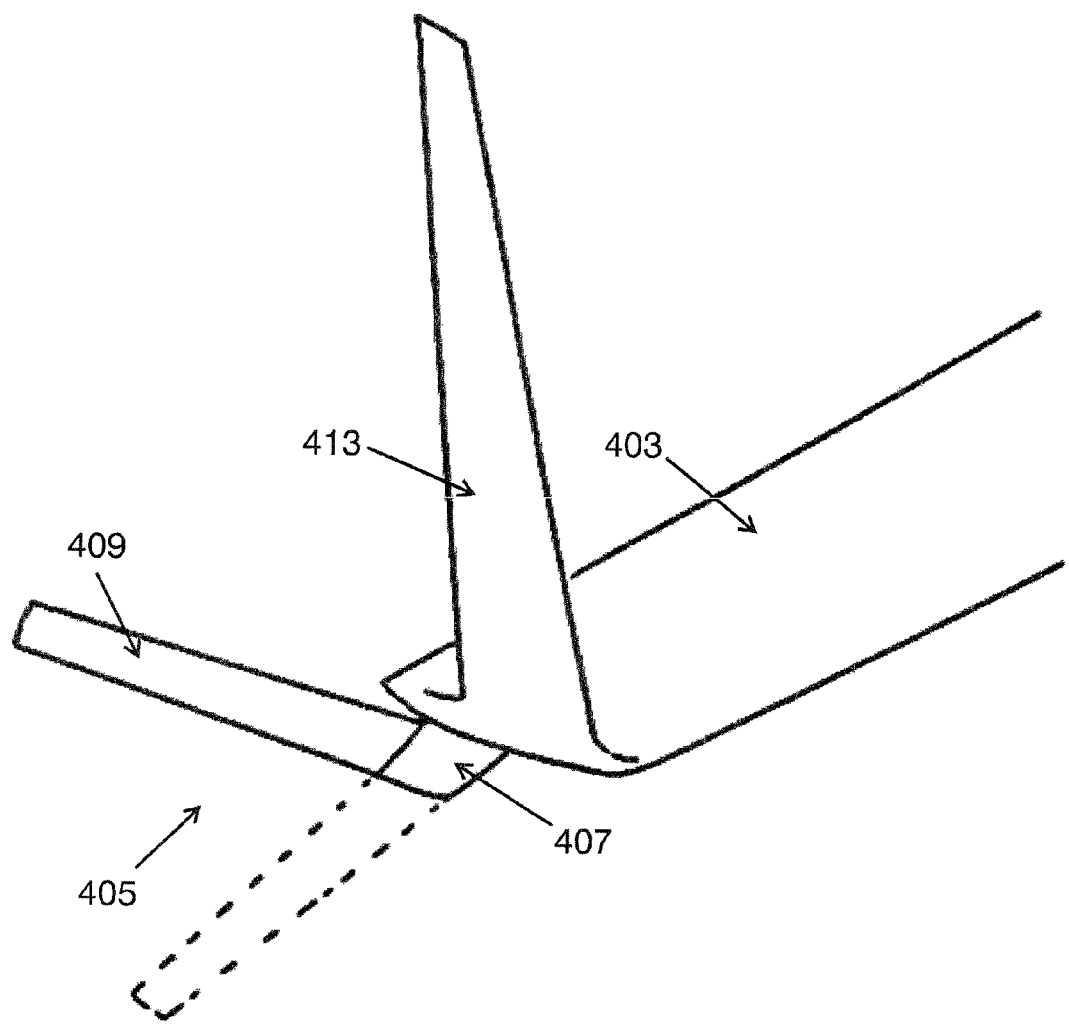
FIG. 10 is a perspective view of a wing and wing tip device on an aircraft according to yet another embodiment of the invention.
Figure 11:
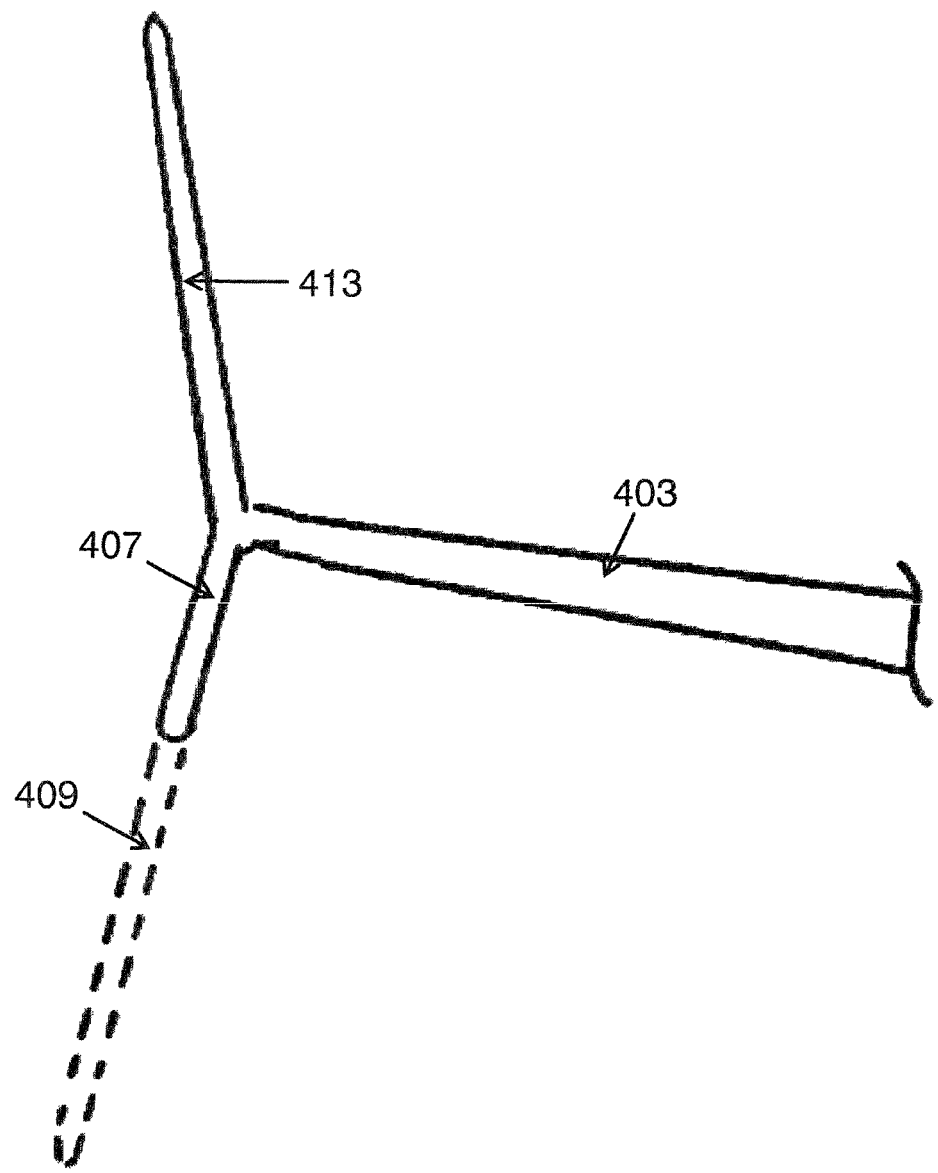
FIG. 11 is an end-on view of the wing and wing tip device of FIG. 10.

Yet another embodiment of the invention is shown in FIGS. 10 and 11, the reference numbers are 400 series numbers and each correspond to a respective one of the 100 series numbers shown in FIGS. 5 to 7. For example, the end of a wing is designated by reference number 403 in FIG. 10 and designated by 103 in FIG. 5. This embodiment of the invention is identical to the second embodiment except that the wing tip does not include a bulbous body at the root of the upwardly and downwardly extending devices 413 and 405.

Figure 12A:
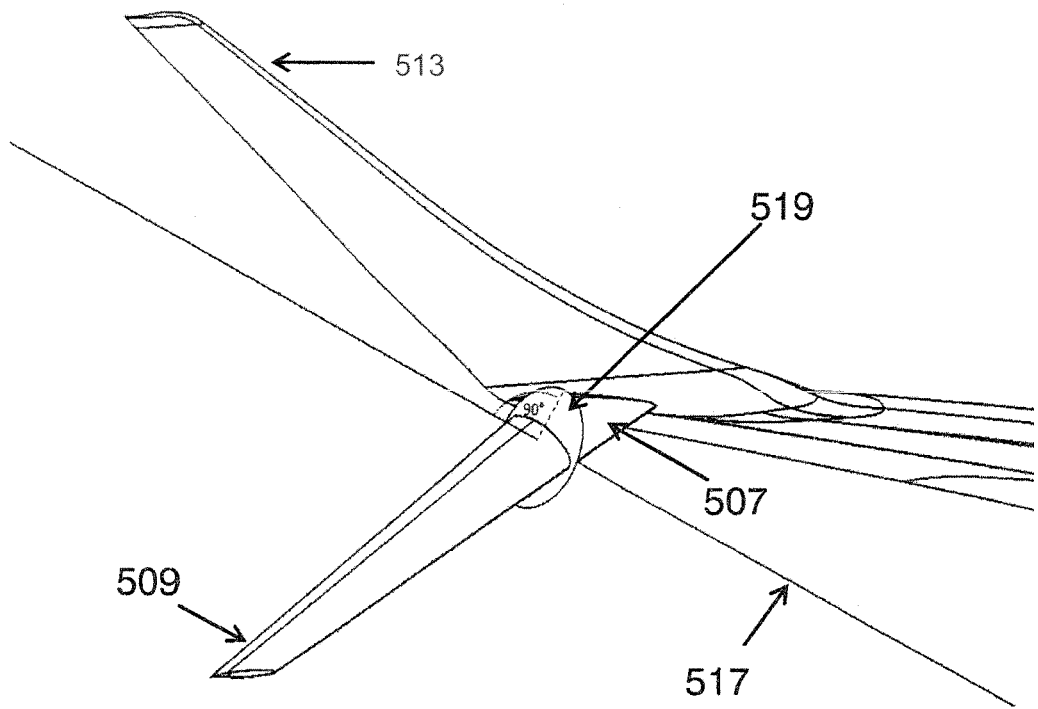
FIGS. 12a and 12b are perspective views of a wing and wing tip device according to a further embodiment of the invention, the wing tip device being shown in the high-altitude cruise and the ground-operating configurations respectively.
Figure 12B:
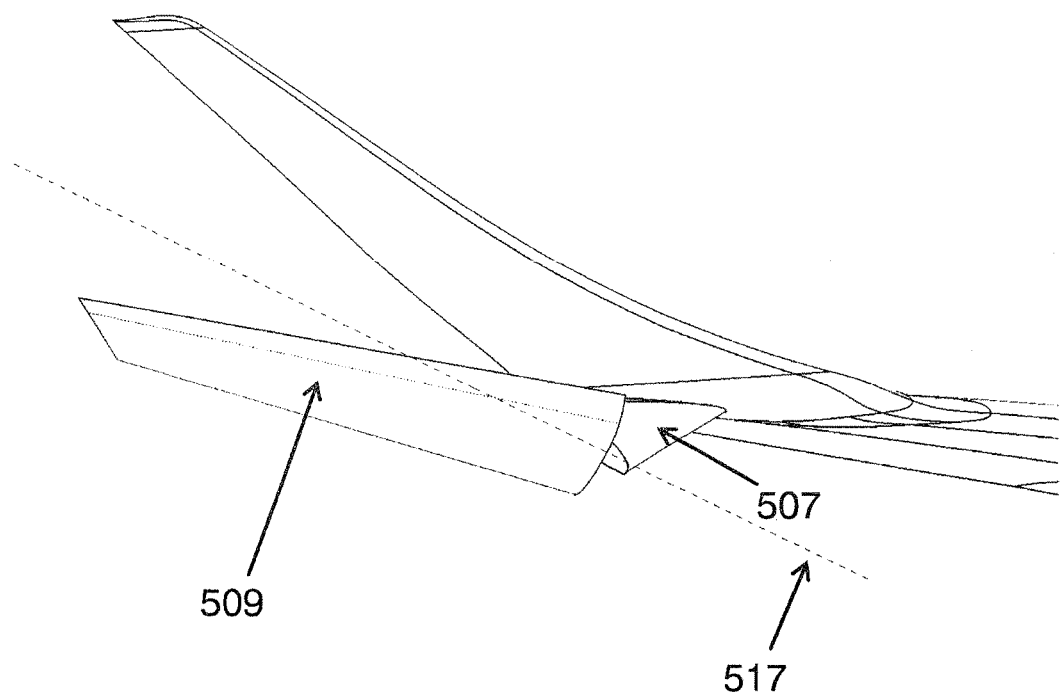
Figure 12C:
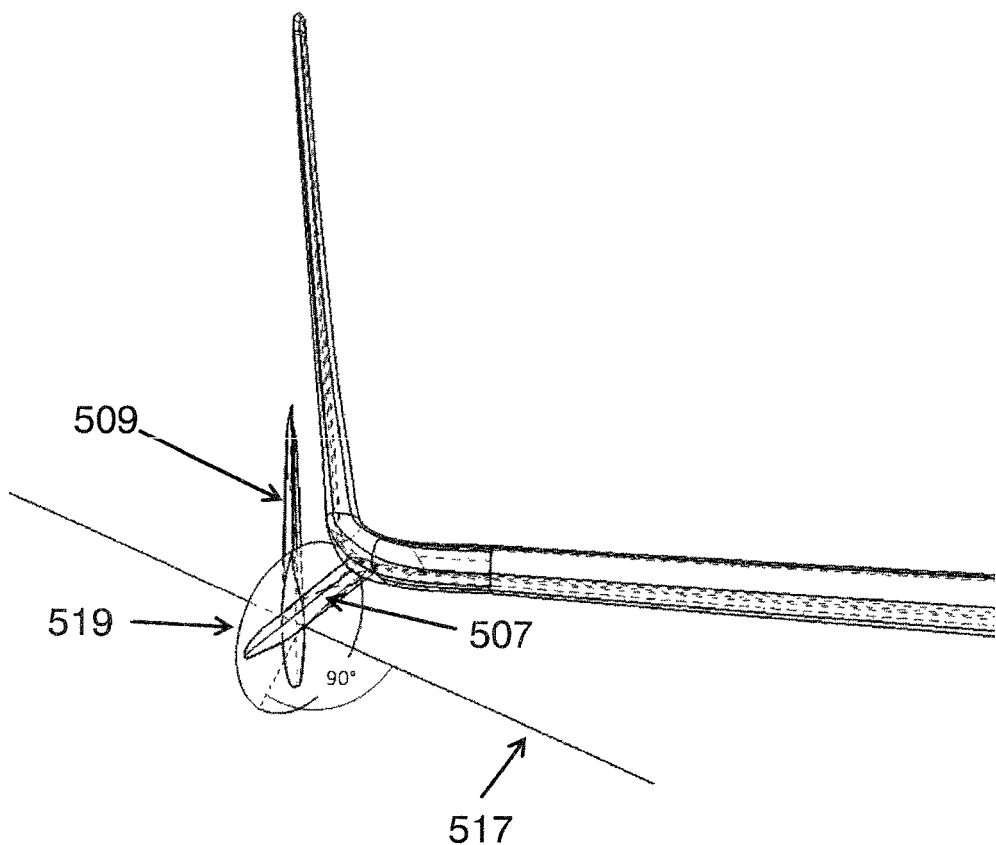
FIG. 12c is a front view of the wing tip device in FIG. 12b.

In the above-mentioned embodiments, the moveable region is rotatably mounted on the underside of the structure defining the fixed region, and the axis of rotation of the moveable region 9, 109, 209, 309 and 409-extends perpendicularly out of the plane of the wing tip device 5, 105, 205, 305 and 405 such that the moveable region rotates in its own plane. FIGS. 12a to 12c show a further embodiment of the invention. The reference numbers in FIGS. 12a to 12c are 500 series numbers and each correspond to a respective one of the 100 series numbers shown in FIGS. 5 to 7. For example, the upwardly extending device is designated by reference number 513 in FIG. 12a and designated by 113 in FIG. 5. In FIGS. 12a to 12c, the moveable region 509 instead rotates about an axis 517 that is inclined to the plane of the wing tip device (the axis 517 thus extending at an angle out of the page in FIGS. 12a to 12c). In this embodiment, the fixed and moveable regions 507,509 do not overlap; instead the regions are divided along a cut-plane 519 passing through the wing tip device 505 (a notional elliptical boundary of the plane is shown in FIGS. 12a and 12c to indicate the cut-plane). The cut-plane 519 is orientated perpendicular to the axis of rotation 517. This ensures that when the moveable region 509 rotates from the high-altitude lift configuration (see FIG. 12a) to the ground-operating configuration (see FIGS. 12b and 12c), it does not interfere with the fixed region 507. Orientating the cut-plane 517 in this manner removes the need for cut-aways in one or both regions of the wing tip device 505, and/or the need for more complex rotational movements.

Whilst the present invention has been described and illustrated with reference to particular embodiments, it will be appreciated by those of ordinary skill in the art that the invention lends itself to many different variations not specifically illustrated herein. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A wing for an aircraft, the wing including an end and comprising:
    a wing tip device at the end, wherein the wing tip device is configurable between:
    (i) a high-altitude cruise configuration in which the wing tip device extends downwardly below the wing; and
    (ii) a ground-operating configuration in which the wing tip device extends rearwardly such that the ground clearance of the wing tip device is increased and an effective span of the wing is decreased.

2. The wing according to claim 1, wherein the wing tip device comprises a moveable region that is rotatable about an axis of rotation extending out of a plane of the wing tip device, such that: in the high-altitude cruise configuration the moveable region extends downwardly below the wing; and in the ground-operating configuration the moveable region extends rearwardly behind the wing.

3. The wing according to claim 1, wherein the aircraft is suitable for high-altitude flight between 15,000 and 45,000 ft.

4. The wing according to claim 1, wherein the aircraft is suitable for flight at speeds of between Mach 0.5 and Mach 0.9.

5. The wing according to claim 1 wherein the wing is a dihedral wing.

6. The wing according to claim 1, wherein the end of the wing comprises a bulbous body protruding beyond an airfoil cross-section of the wing, the wing tip device extending from the bulbous body.

7. The wing according to claim 1, the end of the wing having a second wing tip device, and wherein second wing tip device extends upwardly above the wing.

8. An aircraft comprising at least one wing according to claim 1.

9. An aircraft comprising:
    a wing including an end;
    a wing tip device at the end of the wing, wherein the wing tip device comprises a moveable region that is rotatable, about an axis of rotation extending out of a plane of the wing tip device, between:
    (i) a high-altitude cruise configuration in which the moveable region extends downwardly below the wing; and
    (ii) a ground-operating configuration in which the moveable region extends rearwardly such that the ground clearance of the wing tip device is increased.

10. The aircraft according to claim 9 wherein the wing tip device comprises a fixed region which extends downwardly from the wing and is fixed relative thereto, and wherein the moveable region is rotatably mounted on the fixed region.

11. A method of configuring a wing tip device on a wing of an aircraft, the method comprising:
    during flight of the aircraft, configuring the wing tip device in a high-altitude cruise configuration, wherein the wing tip device downwardly extends below the wing; and
    during ground-based operations of the aircraft, configuring the wing tip device in a ground-operating configuration, wherein the wing tip device extends rearwardly behind the wing to increase the ground clearance of the wing tip device and to decrease an effective span of the wing and wing tip device.

* * * * *